(12) United States Patent
Cholewo

(10) Patent No.: US 6,833,937 B1
(45) Date of Patent: Dec. 21, 2004

(54) METHODS AND APPARATUS FOR COLOR MAPPING

(75) Inventor: Tomasz J. Cholewo, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/489,228

(22) Filed: Jan. 21, 2000

(51) Int. Cl.$^7$ ................................................ G03F 3/08
(52) U.S. Cl. ....................... 358/518; 358/520; 382/162; 382/167
(58) Field of Search ......................... 358/518, 1.9, 520, 358/521, 525, 523, 535; 382/162, 167, 276, 274

(56) References Cited

U.S. PATENT DOCUMENTS

| | | | | |
|---|---|---|---|---|
| 4,500,919 A | * | 2/1985 | Schreiber | 358/518 |
| 4,590,515 A | * | 5/1986 | Wellendorf | 358/500 |
| 4,965,664 A | * | 10/1990 | Udagawa et al. | 358/521 |
| 5,172,223 A | * | 12/1992 | Suzuki et al. | 358/529 |
| 5,204,948 A | * | 4/1993 | Kato | 358/520 |
| 5,237,517 A | * | 8/1993 | Harrington et al. | 382/162 |
| 5,299,291 A | * | 3/1994 | Ruetz | 358/1.9 |
| 5,319,473 A | * | 6/1994 | Harrington | 358/501 |
| 5,341,464 A | * | 8/1994 | Friedman et al. | 345/590 |
| 5,377,025 A | * | 12/1994 | Spaulding et al. | 358/518 |
| 5,596,510 A | * | 1/1997 | Boenke | 358/523 |
| 5,625,378 A | * | 4/1997 | Wan et al. | 345/600 |
| 5,650,942 A | * | 7/1997 | Granger | 358/500 |
| 5,677,967 A | * | 10/1997 | Pariser | 382/167 |
| 5,704,026 A | * | 12/1997 | Wan | 345/590 |
| 5,710,824 A | * | 1/1998 | Mongeon | 382/162 |
| 5,731,818 A | * | 3/1998 | Wan et al. | 345/590 |
| 5,732,205 A | * | 3/1998 | Astle | 345/590 |
| 5,832,109 A | * | 11/1998 | Mahy | 382/162 |
| 5,850,229 A | * | 12/1998 | Edelsbrunner et al. | 345/473 |
| 6,023,527 A | * | 2/2000 | Narahara | 382/167 |
| 2001/0038459 A1 | * | 11/2001 | Mahy | 358/1.9 |
| 2002/0154325 A1 | * | 10/2002 | Holub | 358/1.9 |
| 2003/0043166 A1 | * | 3/2003 | Kumada et al. | 345/589 |
| 2003/0053682 A1 | * | 3/2003 | Haikin et al. | 382/162 |
| 2003/0147088 A1 | * | 8/2003 | Kulkarni | 358/1.9 |

FOREIGN PATENT DOCUMENTS

| | | | | |
|---|---|---|---|---|
| EP | 1146726 | * | 10/2001 | H04N/1/60 |
| WO | WO 97/28640 | * | 8/1997 | H04N/1/60 |

OTHER PUBLICATIONS

Katoh, N., et al., "Gamut mapping for computer generated images (II)", The Fourth Color Imaging Conference: Color Science, Systems and Applications, 126–129.*

Malinowski, A., et al., "Inverse mapping with neural network for control of nonlinear systems", Proceedings of the IEEE International Symposium on Circuits and Systems (ISCAS), vol. 3, Atlanta, GA 453–456, (May 1996).*

(List continued on next page.)

*Primary Examiner*—Kimberly Williams
*Assistant Examiner*—Tia A Carter
(74) *Attorney, Agent, or Firm*—John A. Brady

(57) ABSTRACT

A method and apparatus for mapping a color space to a colorant space. The method comprises an operation for selecting a color value from a color space, identifying a color value in a colorant space that minimizes a function parameterized to the color value selected from the color space, and associating the color value selected from the color space with the color value identified in the colorant space. An apparatus for mapping a color space to a colorant space comprises a processing unit, a memory unit coupled to the processing unit, and a software means. The software means is operative on the processing unit for minimizing an error function of a differentiable function capable of mapping a colorant space to a color space to obtain a function capable of mapping the color space to the colorant space. The error function includes a color difference error.

17 Claims, 10 Drawing Sheets

OTHER PUBLICATIONS

Moller, M.A., "A scaled conjugate gradient algorithm for fast supervised learning", Neural Networks, VCol. 6, 525–533 (1993).*

Nakauchi, S., et al., "Color gamut mapping by optimizing perceptual image quality", Proceedings of the IS&T/SID Color Imagin Conference, Scottsdale, AZ, 63–67 (Nov. 1996).*

Tominaga, S., "Color conversion using neural networks", Proceedings of SPIE, San Jose, CA, 66–75, (Jan. 1998).*

Tominaga, S., "Color mapping method for CMYK printers and its evaluation", Proceedings of the IS&T/SID Color Imaging Conference, Scottsdale, AZ, 172–176, (Nov. 1996).*

* cited by examiner

METHODS AND APPARATUS FOR COLOR MAPPING

FIELD OF THE INVENTION

This invention relates to color mapping, and more particularly, it relates to mapping from a color space to a colorant space.

BACKGROUND OF THE INVENTION

Digital image forming devices, such as color printers and copiers, are often required to map a color image gamut from a color space to a colorant space. For example, the color gamut of a photograph may be represented in the CIELAB color space, and the color gamut of an image forming device may be represented in the CMYK color space. Before the image forming device can print or display the image, the image represented in the CIELAB color space must be converted to the CMYK color space. Several problems must be solved in converting an image gamut from the CIELAB color space to the CMYK color space. First, the problem of mapping out-of-gamut colors (i.e., points in the color space that do not have a corresponding point in the colorant space) must be solved. Second, the problem of generating a K signal defining the amount of black used in addition to the CMY colorants must be solved.

For each out-of-gamut color, a color in the printer gamut is selected and substituted for the out-of-gamut color. Strategies for selecting gamut colors to print in place of out-of-gamut CIELAB colors generally attempt to select colors in a consistent manner that preserves some characteristic of the original image. Examples of such strategies include chroma clipping, lightness preservation, and chroma preservation. Unfortunately, methods and apparatus for mapping from a color space to a colorant space are designed to execute only a single out-of-gamut strategy and are not easily modified to execute alternative strategies.

Black is added to CMY colorants in order to increase the dynamic range of the colorant space. Various strategies are employed to maintain a particular color in an image while reducing the CMY colorants and increasing the amount of black added to the CMY colorants. One approach employs an inverse mapping method for direct training of a neural network controller for CIELAB to CMYK conversion. Unfortunately, this method does not allow for explicit black generation specification.

For these and other reasons there is a need for the present invention.

SUMMARY OF THE INVENTION

The above mentioned problems with mapping from a color space, such as a CIELAB color space, to a colorant space, such as a CMYK color space, are addressed by the present invention which will be understood by reading and studying the following specification. A method and apparatus for color mapping is described. The method identifies a forward function for mapping a colorant space to a color space. Error terms and constraint terms are identified. Finally, the method associates values from the color space with values from the colorant space by minimizing the error function parameterized to each element of the color space.

In one embodiment of the invention, a method comprises the operations of selecting, identifying and associating. In the selecting operation, a color value from a color space is selected. In the identifying operation, a color value in a colorant space that minimizes a function parameterized by the color value selected from the color space is identified. And in the associating operation, the color value selected from the color space is associated with the color value identified in the colorant space.

In an alternate embodiment, a method comprises the operations of selecting a differentiable function and minimizing a function of the differentiable function parameterized to a color value in a color space to obtain a color value in a colorant space.

In another alternate embodiment, a method for obtaining a mapping of a color space to a colorant space comprises the operations of identifying and minimizing. In the identifying operation a differentiable function capable of mapping the colorant space to the color space is identified. In the minimizing operation, an error function of the differentiable function is minimized to obtain the mapping of the color space to the colorant space.

In another alternate embodiment, a method comprises identifying a differentiable function capable of mapping a colorant space to a color space and obtaining an inverse function of the differentiable function by solving a constrained optimization problem in which an error function includes errors in the color space and errors in the colorant space.

In another alternate embodiment, a method for building a color look-up table for a CMYK printer comprises a series of operations. The first operation includes identifying a differentiable function capable of mapping a CMYK space having a plurality of CMYK space values to a color space having a plurality of color space values. The second operation includes minimizing an error function of the differentiable function to obtain a function capable of mapping the color image space to the CMYK space. The error function includes a color difference error. The third operation includes populating the color look-up table such that the color look-up table is capable of mapping at least one of the color image space values to at least one of the plurality of CMYK space values according to the function.

In another alternate embodiment, a method for building a color look-up table for a scanner-printer comprises identifying a differentiable function capable of mapping a CMYK printer space having a plurality of CMYK printer space values to an RGB scanner space having a plurality of RGB scanner space values. The method further comprises minimizing an error function of the differentiable function to obtain a function capable of mapping the RGB scanner space into the CMYK printer space. The error function includes only a printer gamut boundary condition. Finally, the method comprises populating the color look-up table such that the color look-up table is capable of mapping at least one of the RGB scanner space values to at least one of the plurality of CMYK printer space values according to the function.

In another alternate embodiment, a method for printing an image comprises acquiring an image having a color space, identifying a differentiable function capable of mapping a colorant space to the color space, and minimizing an error function of the differentiable function to obtain a function capable of mapping the color space to the colorant space. The error function includes a color difference error and a printer constraint. The method further comprises mapping the color space to the colorant space according to the function and transmitting the colorant values to an imaging unit.

In another alternate embodiment, an apparatus for mapping a color space to a colorant space comprises a processing unit, a memory unit coupled to the processing unit, and software means operative on the processing unit. The software means is operative for minimizing an error function of a differentiable function capable of mapping a colorant space to a color space to obtain a function capable of mapping the color space to the colorant space. The error function includes a color difference error.

In another alternate embodiment, an apparatus for printing a color image having a color space on a printing unit having a colorant space comprises a processing unit, a memory unit, an imaging unit, and a software means operative on the processing unit. The memory unit and the imaging unit are coupled to the processing unit, and the software means is operative on the processing unit. The software means is capable of executing a series of operations. First, the software means is capable of identifying a differentiable function capable of mapping the colorant space to the color space. Second, the software means is capable of minimizing an error function of the differentiable function to obtain a function capable of mapping the color space to the colorant space. The error function includes a color difference error and a printer constraint. Third, the software means is capable of mapping the color space to the colorant space according to the function and transmitting the colorant space to the imaging unit.

DETAILED DESCRIPTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

The present invention provides a method and apparatus for finding colorant amounts for which a printer will produce a requested color appearance based on constrained optimization. An error function defines the gamut mapping method and black replacement method. The constraints limit the feasible solution region to the device gamut and prevent exceeding the maximum total area coverage. Colorant values corresponding to in-gamut colors are found with precision limited only by the accuracy of the device model. Out-of-gamut colors are mapped to colors within the boundary of the device gamut. This approach, used in conjunction with different types of color difference equations, can perform out-of-gamut mappings, such as chroma clipping and can find colors on the gamut boundary having specified properties.

Description of One Embodiment of the Method

Figure 1A:
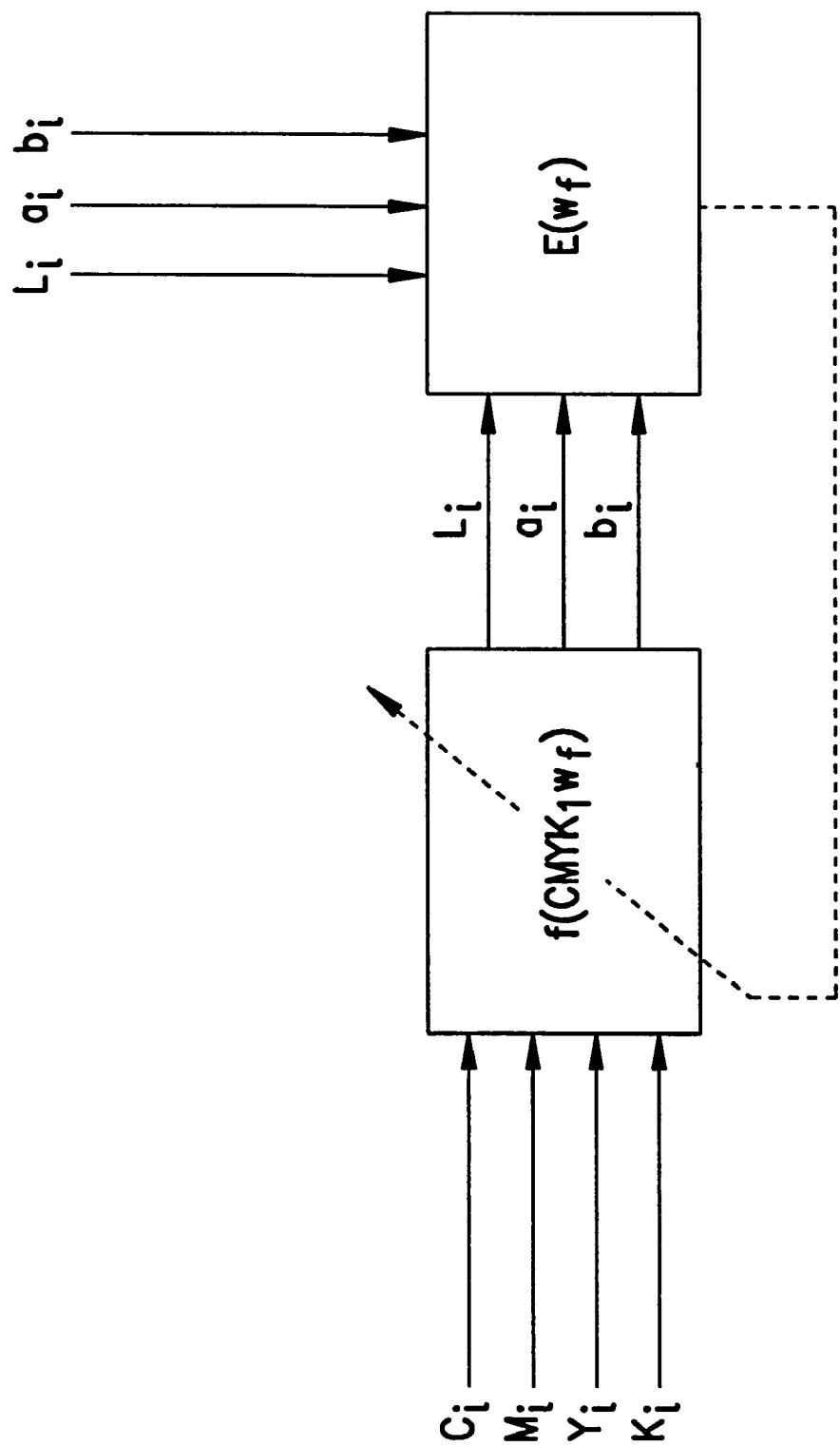
FIG. 1A is a block diagram of a printer model.

FIG. 1A is a block diagram of a printer model. The dashed arrow represents the process of adapting the model parameter $w_f$ in order to minimize the error function $E(w_f)$. A continuous model f of the printer which, for each value CMYK in the colorant space CMYK, calculates a corresponding value Lab in the CIELAB color space:

$$\text{Lab}=f(CMYK, w_f).$$

Vector $w_f$ represents model parameters. A number of different techniques, such as Neugebauer equations, lookup tables with interpolation, fuzzy logic, or polynomial regression, can be used for implementing the function f. The printer model is developed by printing a set of color patches with known colorant values CMYK, and measuring the corresponding color values of the patches $\text{Lab}_{di}$. The best fit model parameters $w_f^*$ are found by minimizing an error criterion, such as a sum of squared color differences:

$$w_f^* = \arg\min_{w_f} \sum_{i=1}^{N} [\Delta E(f(CMYK_i, w_f), Lab_{di})]^2$$

where N is the number of patches and $\arg\min_x f(x)$ denotes a value of argument x for which function $f(x)$ attains a minimum value.

The CIELAB space is not perceptually uniform. This can present problems during gamut mapping because there exist colors with identical values of h* coordinate having different perceived hue. This effect is most pronounced for the blue and red colors. Performing gamut mapping in a uniform color space such as Munsell LAB (MLAB) prevents hue shifts. In one embodiment, to prevent hue shifts, CIELAB measurement data is converted to MLAB and a printer model is created with MLAB outputs. This permits the use of error difference formulas based on the perceptual uniformity assumption.

One goal is the generation of the inverse mapping for the printer which for each perceptual color value produces suitable colorant amounts. One method of obtaining the solutions includes creating an inverse model which can be queried for specific color values. An inverse model h is a vector function $CMYK = h(Lab, w_h)$ where $w_h$ is a vector of parameters.

Figure 1B:
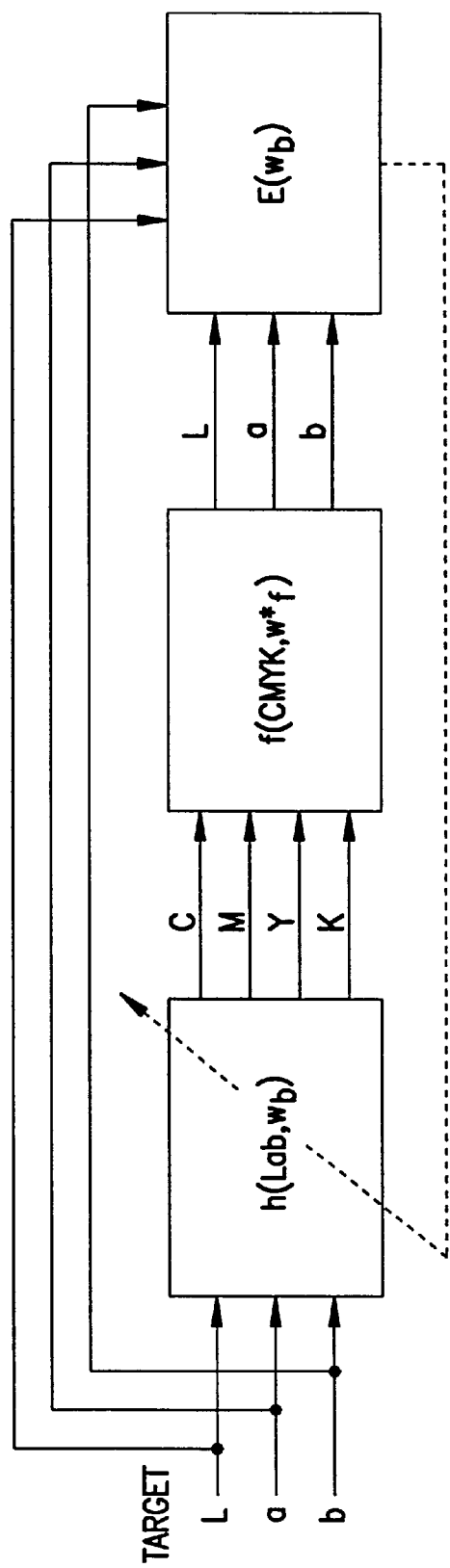
FIG. 1B is a block diagram of a printer model optimization process.

FIG. 1B is a block diagram of a printer model optimization process. The dashed arrow represents the process of adapting the model parameter CMYK in order to minimize the error function E(CMYK). In the optimization process, the $w_h$ vector of parameters are optimized by minimizing the error function E subject to constraints in the colorant space:

$$w_h^* = \arg\min_{w_h} \sum_i E(f(h(Lab_i, w_h), w_f^*), Lab_i).$$

Values $Lab_i$ span the set of colors for which the parameters are to be optimized. After optimization, the function $h(Lab, w_h^*)$ is sampled to create a multi-dimensional lookup table.

Figure 1C:
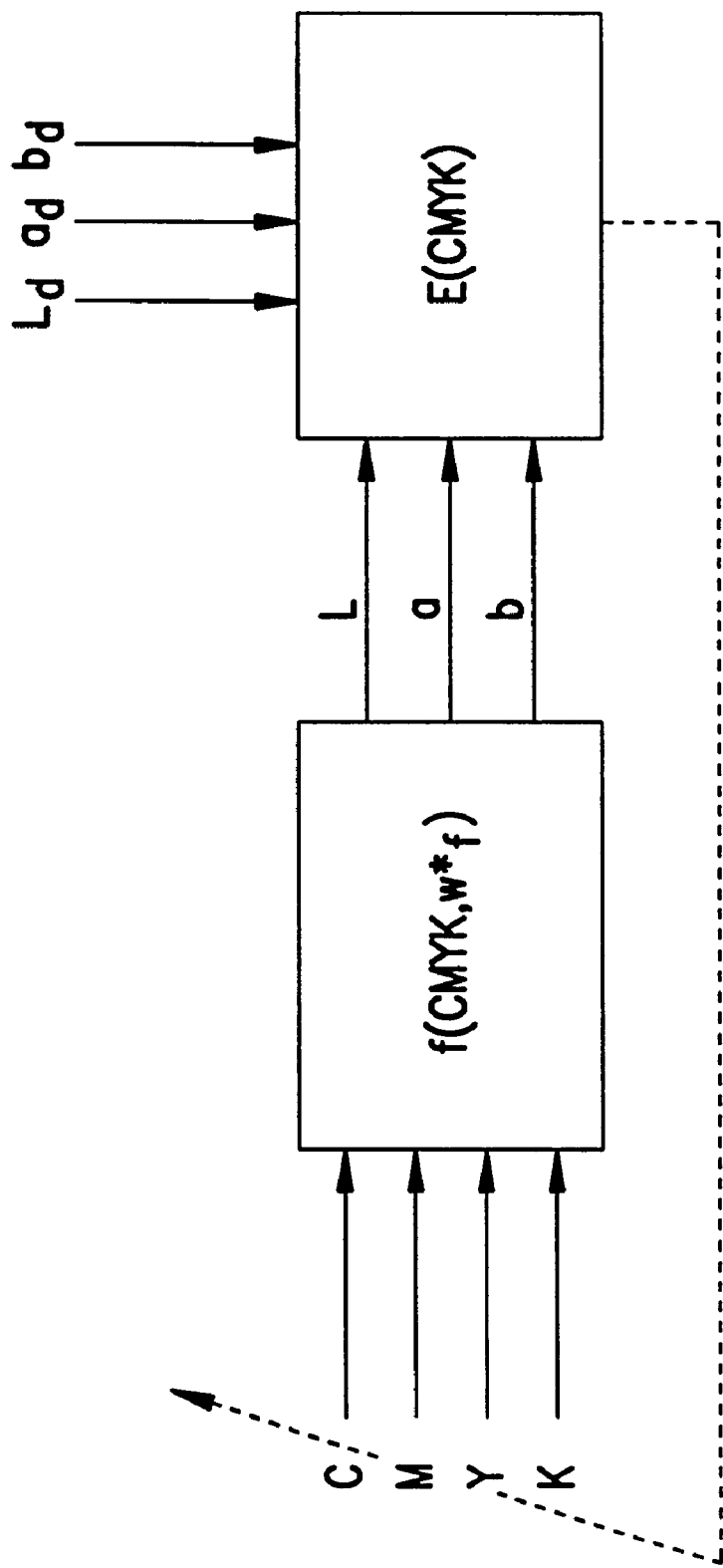
FIG. 1C is block diagram of an alternate embodiment of a method of finding the inverse mapping by computing the color values for each color point individually.

FIG. 1C is block diagram of an alternate embodiment of a method of finding the inverse mapping by computing the color values for each color point individually. The dashed arrow represents the process of adapting the model parameter $w_h$ in order to minimize the error function $E(w_h)$. In this embodiment, the desired colorant values $CMYK_i^*$ are found for a particular color $Lab_i$ by means of minimizing a cost function E related to the accuracy of color reproduction and gamut mapping with constraints reflecting the device gamut and printing process limitations:

$$CMYK_i^* = \arg\min_{CMYK} E(f(CMYK, w_f^*), Lab_i). \quad (1)$$

Color Difference Error Function

In one embodiment, the color difference is the distance in the Cartesian CIELAB color space. Axes in this space are lightness (L*) and two chromatic coordinates (a* and b*). Different factors, S, can be applied to errors in each dimension to obtain a formula similar to a square of the $\Delta E_{76}$ color difference equation:

$$E_{CIELAB}(Lab, Lab_d) = \frac{1}{2}[S_L(L^* - L_d^*)^2 + S_a(a^* - a_d^*)^2 + S_b(b^* - b_d^*)^2].$$

The square root is omitted to make it easier to calculate the error gradient with respect to color coordinates:

$$\nabla_{Lab} E_{CIELAB}(Lab, Lab_d) = \left[\frac{\partial E}{\partial L^*}, \frac{\partial E}{\partial a^*}, \frac{\partial E}{\partial b^*}\right]^T$$
$$= [S_L(L^* - L_d^*), S_a(a^* - a_d^*), S_b(b^* - b_d^*)]^T.$$

Gamut mapping is performed more conveniently in the perceptual coordinates of the CIELCH space. The cylindrical coordinates of CIELCH space are lightness (L*), chroma (C*), and hue (h*), which are obtained from the CIELAB coordinates using the formulas:

$$L^* = L^*; \quad C^* = \sqrt{a^{*2} + b^{*2}}; \quad h^* = \arctan\frac{b^*}{a^*}.$$

The error formula in this color space is similar to the $\Delta E_{94}$ CIE color difference equation:

$$E_{CIELCH}(LCh, LCh_d) = \frac{1}{2}[S_L(L^* - L_d^*)^2 + S_C(C^* - C_d^*)^2 + S_h(h^* - h_d^*)^2].$$

Here, the values of the S coefficients are not determined by the value of chroma coordinate but are chosen to obtain the desired weighing of each coordinate. These weights can vary depending on the desired color $LCh_d$.

The error gradient of the above error with respect to CIELCH coordinates is:

$$\nabla_{LCh} E_{CIELCH}(LCh, LCh_d) = [S_L(L^* - L_d^*), S_C(C^* - C_d^*), S_h(h^* - h_d^*)]^T.$$

For computational convenience and to avoid problems associated with the hue angle discontinuity, both the error and the gradient are expressed as functions of L*, a*, and b*:

$$E_{CIELCH}(Lab, Lab_d) =$$
$$\frac{1}{2}[S_L(L^* - L_d^*)^2 + S_C(C^* - C_d^*)^2 + S_h(C^*C_d^* - a^*a_d^* - b^*b_d^*)].$$

The gradient then becomes:

$$\nabla_{Lab} E_{CIELCH}(Lab, Lab_d) = [S_L(L^* - L_d^*), \gamma a^* - S_h a_d^*, \gamma b^* - S_h b_d^*]^T$$

where $$\gamma = S_C + \frac{C_d^*}{C^*}(S_h - S_C).$$

Similar equations have been used for printer model adaptation, but their formulation was based on trigonometric functions which are more expensive to calculate.

By setting $S_L = S_h = 1$ and $S_C = 0.1$, a three-dimensional out-of-gamut mapping that resembles chroma clipping is obtained. Making $S_C > S_h > S_L$ results in a mapping that attempts to preserve the chroma at the cost of accuracy in hue and lightness, which can be used for creation of lookup tables for the ICC saturation rendering intent. Experiments performed on gamut mapping of computer-generated images show that most observers prefer mappings performed with $S_L \geq S_h \geq S_C$. The weights S are related to the coefficients K:

$$S_L = 2/K_L^2, \quad S_C = 2/K_C^2, \text{ and } S_h = 2/K_H^2.$$

The specific values of coefficients S do not significantly influence in-gamut color mapping because for them $E_{CIELCH} = 0$ is attainable. However, even in this case they can come back into play if unrealistic values of $K_d$ (see below) are requested.

Physical Gamut Constraint

The physical gamut constraint reflects the fact that one cannot request less than 0 percent or more than 100 percent of each of the colorants:

$$0 \leq C, M, Y, K \leq 1.$$

In the presence of natural boundaries, points on the surface of the gamut may correspond to non-extreme values of colorants, i.e., the gamut constraint may not be activated.

Total Area Coverage Constraint

Most printing processes have technological limitations that reduce the maximum total area coverage (TAC), i.e., the total amount of colorants printed at any point. For inkjet printers, excessive amounts of ink may cause soaking and wrinkling of the paper. Electrophotographic printers may exhibit poor fusing when a toner layer is too thick. Therefore, an additional constraint is imposed which limits the effective gamut of a printer to colors that can be produced without exceeding the TAC:

$$C+M+Y+K \leq TAC.$$

This constraint can be extended to handle colorants with different physical properties by using a weighted sum of colorants in the above equation.

Black Preference Error Function

Printers using more than three colorants have additional degrees of freedom to represent a specified color. For example, it is possible to render all colors strictly inside the CMYK printer gamut using infinitely many colorant combinations. The preferred level of black replacement can be selected by means of an additional error term, for example:

$$E_{black}(CMYK, K_d) = 1/2(K - K_d)^2.$$

Its gradient is:

$$\nabla_{CMYK} E_{black}(CMYK, K_d) = [0, 0, 0, K - K_d]^T.$$

In one method for calorimetric black replacement, for each color the maximum ($K_{max}$) and minimum ($K_{min}$) amounts of black with which it can be reproduced are determined. In one embodiment of the present invention, $K_{max}$ and $K_{min}$ are found by inverting the printer model with $K_d = 1$ and $K_d = 0$, respectively, and with $S_{black}$ set to a small value. Then the final inversion is performed with $K_d$ set to a value between these two numbers. These steps take into account TAC constraints.

Conversion from a calibrated CMYK space such as SWOP to a device CMYK space is important for applications such as offset press emulation. The calibrated CMYK spaces are usually defined by a table of standardized measurements relating a particular CMYK value to a CIELAB value. This provides a specific value of black $K_d$ which is used for preserving the original separation settings during creation of calibrated CMYK to device CMYK mappings. Emulation based on ICC profiles loses information about the black separation when the data is converted through the three-channel CIELAB space.

Solving the Constrained Optimization Problem

Figure 2A:
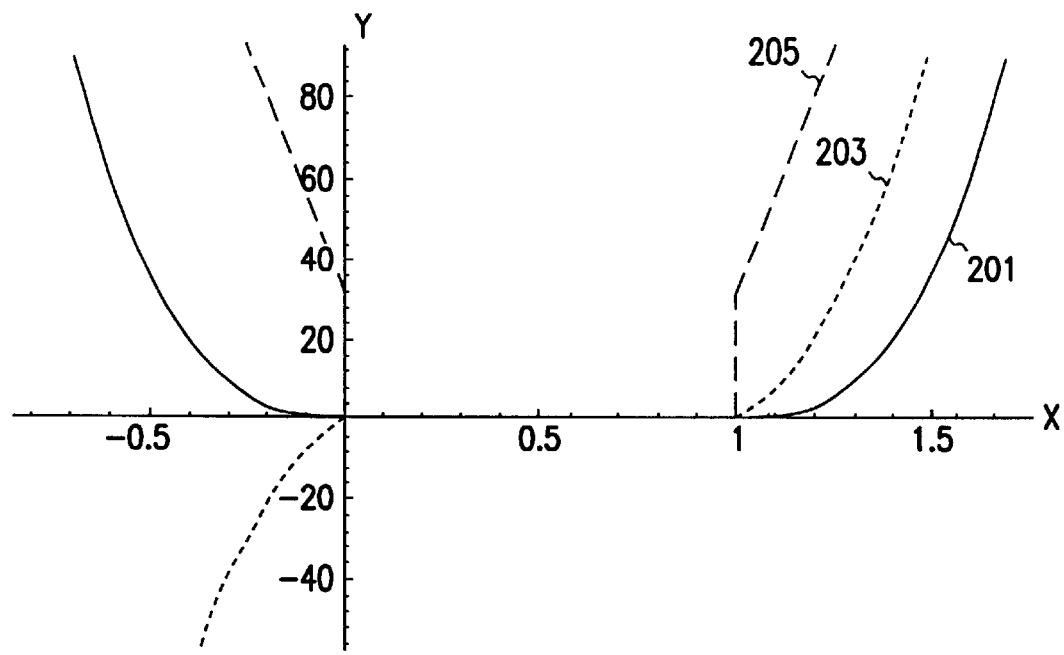
FIG. 2A is a graph of a biquadratic penalty function.

To minimize the error function in the presence of constraints, special optimization algorithms are used. For example, in one embodiment when only physical gamut constraints are specified a bound-constrained optimization algorithm LBFGS is employed. However, for the inverse model method (shown in FIG. 1B) the colorant space constraints become very complicated: $0 \leq h(Lab, w_h)_i \leq 1$. Therefore, the constraints to additional error terms are converted. This allows use of simpler unconstrained optimization algorithms. In one embodiment, an efficient second-order optimization algorithm known as scaled conjugate gradient is used. Each constraint is replaced by a penalty function which is continuous in the control space. This function should be equal to zero when the condition is satisfied (for example $0 \leq x \leq 1$) and greater than zero otherwise. FIG. 2A shows one embodiment of a biquadratic penalty function 201 including a first derivative 203 and a second derivative 205. For biquadraic penalty function 201:

$$p(x) = \begin{cases} 0 & \text{if } 0 \leq x \leq 1; \\ 16x^2(x-1)^2 & \text{otherwise.} \end{cases}$$

Figure 2B:
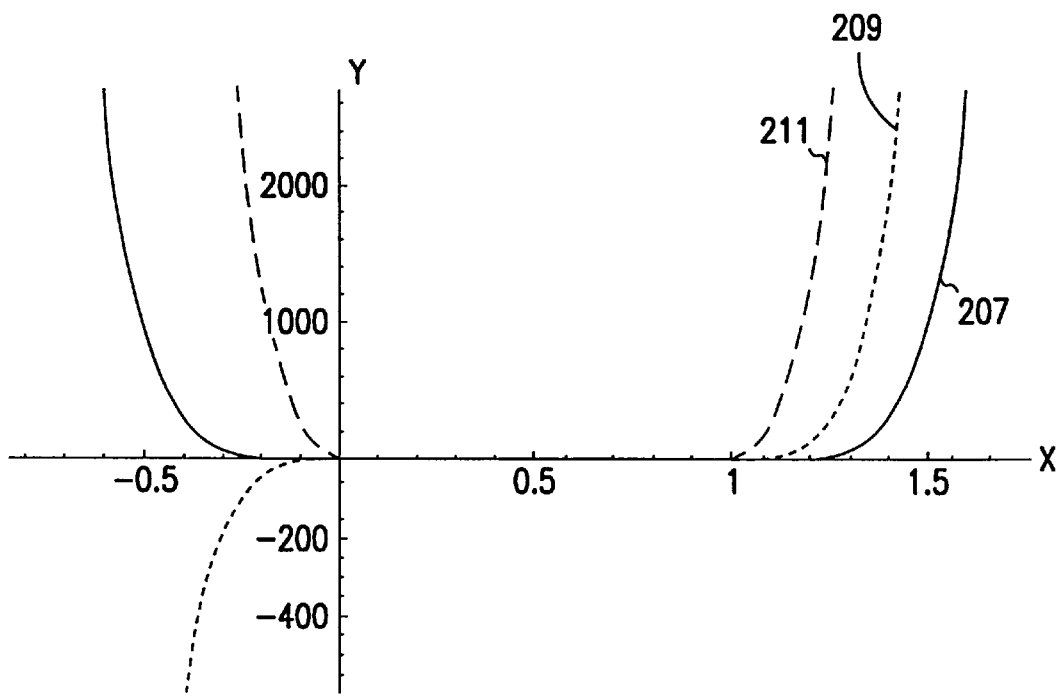
FIG. 2B is a graph of a bicubic penalty function.

FIG. 2B shows one embodiment of a bicubic penalty function 207 including a first derivative 209 and a second derivative 211. For bicubic penalty function 207:

$$p(x) = \begin{cases} 0 & \text{if } 0 \leq x \leq 1; \\ (|2x-1|^3 - 1)^3 & \text{otherwise.} \end{cases}$$

A function, such as bicubic function 207, is needed when an optimization algorithm requires that the first derivative of the error function be smooth.

Using the penalty method, the gamut constraint is converted to an error term:

$$E_{gamut} = P(C) + p(M) + p(Y) + p(K).$$

Its gradient is:

$$\nabla_{CMYK} E_{gamut} = [p'(C), p'(M), p'(Y), p'(K)]^T.$$

For total area coverage:

$$E_{TAC} = p\left[\frac{1}{TAC}(C + M + Y + K)\right]$$

and $$\nabla_{CMYK} E_{TAC} = [\sigma, \sigma, \sigma, \sigma]^T$$

where $$\sigma = \frac{1}{TAC} p'\left(\frac{1}{TAC}(C + M + Y + K)\right).$$

The total error function E(CMYK) consists of the error terms both in the color space (color difference error $E_{CIELCH}$) and in the colorant space (such as gamut and TAC constraint penalties and black preference error) and is parameterized by the desired color value $Lab_d$ and the desired black level $K_d$:

$$E(CMYK, Lab_d, K_d) = E_{CIELCH}(Lab) + E_{CMYK}(CMYK) = E_{CIELCH}(f(C-MYK, w_f), Lab_d) + E_{CMYK}(CMYK, K_d).$$

The control space error function $E_{CMYK}$ is constructed as a weighted sum of two constraint penalties and black preference error:

$$E_{CMYK}(CMYK, K_d) = S_{gamut} E_{gamut} + S_{TAC} E_{TAC} + S_{black} E_{black}.$$

The S coefficients determine the importance of error components, relative to each other and also relative to $E_{CIELCH}$. The gradient of the error function $E_{CMYK}$ with respect to CMYK control variables is $$\nabla_{CMYK} E_{CMYK} = S_{gamut} \nabla_{CMYK} E_{gamut} + S_{TAC} \nabla_{CMYK} E_{TAC} + S_{black} \nabla_{CMYK} E_{black}.$$

Knowledge of the gradient vector of the total error function E with respect to colorant variables is needed for efficient solving of Equation (1). It can be found as:

$$\nabla_{CMYK} E(CMYK, Lab_d, K_d) = \nabla_{CMYK} E_{CIELCH}(f(CMYK, w_f), Lab_d) + \nabla_{CMYK} E_{CMYK}(CMYK, K_d).$$

The first term is then expanded by the derivative chain rule:

$$\nabla_{CMYK}E_{CIELCH}(f(CMYK, w_f^*), Lab_d) = \nabla_{CMYK}(f(CMYK, w_f^*)Lab_d) \cdot \nabla_{Lab}E_{CIELCH}(Lab, Lab_d) = J_f^T \cdot \nabla_{Lab}E_{CIELCH}(Lab, Lab_d)$$

where $J_f$ is the Jacobian matrix of the forward model f, Lab=f((CMYK, $w_f^*$), and $\nabla_{CIELAB}E_{CIELCH}$(Lab, $Lab_d$) was derived above. The Jacobian is determined, usually numerically, for the specific type of the function f used. The previous equation can be written in an expanded form:

$$\begin{bmatrix} \frac{\partial E}{\partial C} \\ \frac{\partial E}{\partial M} \\ \frac{\partial E}{\partial Y} \\ \frac{\partial E}{\partial K} \end{bmatrix} = \begin{bmatrix} \frac{\partial L^*}{\partial C} & \frac{\partial a^*}{\partial C} & \frac{\partial b^*}{\partial C} \\ \frac{\partial L^*}{\partial M} & \frac{\partial a^*}{\partial M} & \frac{\partial b^*}{\partial M} \\ \frac{\partial L^*}{\partial Y} & \frac{\partial a^*}{\partial Y} & \frac{\partial b^*}{\partial Y} \\ \frac{\partial L^*}{\partial K} & \frac{\partial a^*}{\partial K} & \frac{\partial b^*}{\partial K} \end{bmatrix} \begin{bmatrix} \frac{\partial E}{\partial L^*} \\ \frac{\partial E}{\partial a^*} \\ \frac{\partial E}{\partial b^*} \end{bmatrix}.$$

Each of the partial derivatives is evaluated at a specific input CMYK value.

The process of optimization stops when it reaches a stationary point on the error surface. At such a point, by definition, $\nabla E=0$, that is all the "gradient forces" contributed by different error terms are in balance. Since the gamut and limit penalties can be made arbitrarily large, they can effectively trap the solution inside the gamut of the printer. In this way the type of out-of-gamut mapping is determined mainly by the $E_{CIELCH}$ term.

There exists a possibility of getting trapped in a local minimum of the error function. However, experiments show that this is rarely the case for color mappings arising in printer modeling because the relationships between the colorant amounts and the resulting colors are predominantly monotonic and smooth. Suboptimal solutions can be detected by comparing the result with the values obtained for the neighboring colors and corrected by restarting the optimization process with different initial conditions.

Scanner-Printer-Copy Device

In another alternate embodiment, color tables are developed for a scanner-printer-copier device. In this embodiment, the printer device RGB space is $RGB_A$, and the scanner RGB space is $RGB_B$, and $$E_b = E_{RGB_B} = E_{THC}.$$

A device CMYK space is not used, so the target space error function involves only the printer gamut boundary condition:

$$E_a = E_{RGB_A} = S_{gamut}E_{gamut}.$$

For the RGB case the gamut constraint is $$0 \leq R, G, B \leq 1,$$

which is converted to a penalty term as described above. The gradient becomes:

$$\nabla_{RGB_A}E = \nabla_{RGB_A}E_{THC} + S_{gamut}\nabla_{RGB_A}E_{gamut}.$$

Again by the chain rule:

$$\nabla_{RGB_A}E_{THC} = J_f^T \cdot \nabla_{RGB_B}E_{THC}.$$

For models with RGB output, the perceptual concepts of chroma and hue are much less clearly defined, so the cylindrical transform of the YCC color space without gamma conversion is used.

The YCC space is a linear transformation of the RGB space defined in such a way that the main diagonal of the RGB cube becomes the vertical Y axis:

$$\begin{bmatrix} Y \\ C_1 \\ C_2 \end{bmatrix} = \begin{bmatrix} 0.299 & 0.587 & 0.114 \\ -0.299 & -0.587 & 0.886 \\ 0.701 & -0.587 & -0.114 \end{bmatrix} \begin{bmatrix} R \\ G \\ B \end{bmatrix}.$$

The YCC coordinates are converted to the cylindrical space YHC:

$$Y = Y,$$

$$h = \arctan\frac{C_2}{C_1},$$

and $$C = \sqrt{C_1^2 + C_2^2}.$$

The interest is in the color difference, so the fact that the orientation of "hue" angle is different from the CIELAB convention is not significant.

The resulting error formula with appropriate $S_Y$, $S_h$, and $S_C$ weighting coefficients is $$E_{YHC} = \frac{1}{2}(S_Y(Y - Y_d)^2 + S_h(CC_d - C_1C_{1d} - C_2C_{2d}) + S_c(C - C_d)^2).$$

The gradient is: $\nabla_{YCC}E_{YHC} = [S_Y(Y-Y_d), \gamma C_1 - S_h C_{1d}, \gamma C_2 - S_h C_{2d}]^T$, where $$\gamma = S_C + \frac{C_d}{C}(S_h - S_C).$$

The gradient with respect to RGB values is:

$$\nabla_{RGB}E_{YHC} = \begin{bmatrix} \frac{\partial E_{YHC}}{\partial R} \\ \frac{\partial E_{YHC}}{\partial G} \\ \frac{\partial E_{YHC}}{\partial B} \end{bmatrix} = \begin{bmatrix} 0.299 & 0.587 & 0.114 \\ -0.299 & -0.587 & 0.886 \\ 0.701 & -0.587 & -0.114 \end{bmatrix}^T \nabla_{YCC}E_{YHC},$$

where $$\nabla_{YCC}E_{YHC} = \left[\frac{\partial E_{YHC}}{\partial Y}, \frac{\partial E_{YHC}}{\partial C_1}, \frac{\partial E_{YHC}}{\partial C_2}\right]^T.$$

Figure 3A:
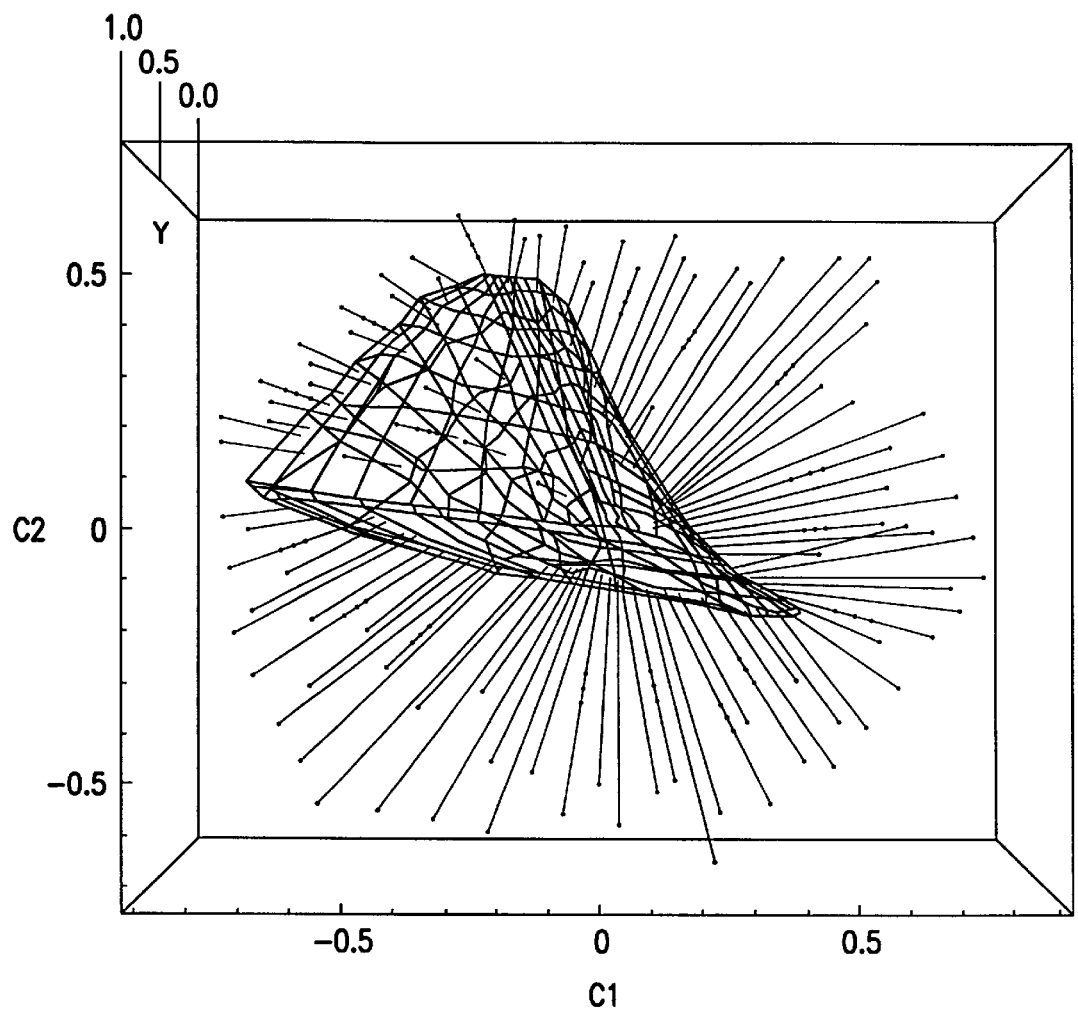
FIG. 3A is an illustration of a sampling of a mapping between a scanner red-green-blue (RGB) color space and an imaging device RGB color space shown as a $C_1C_2$ projection in YCC space.
Figure 3B:
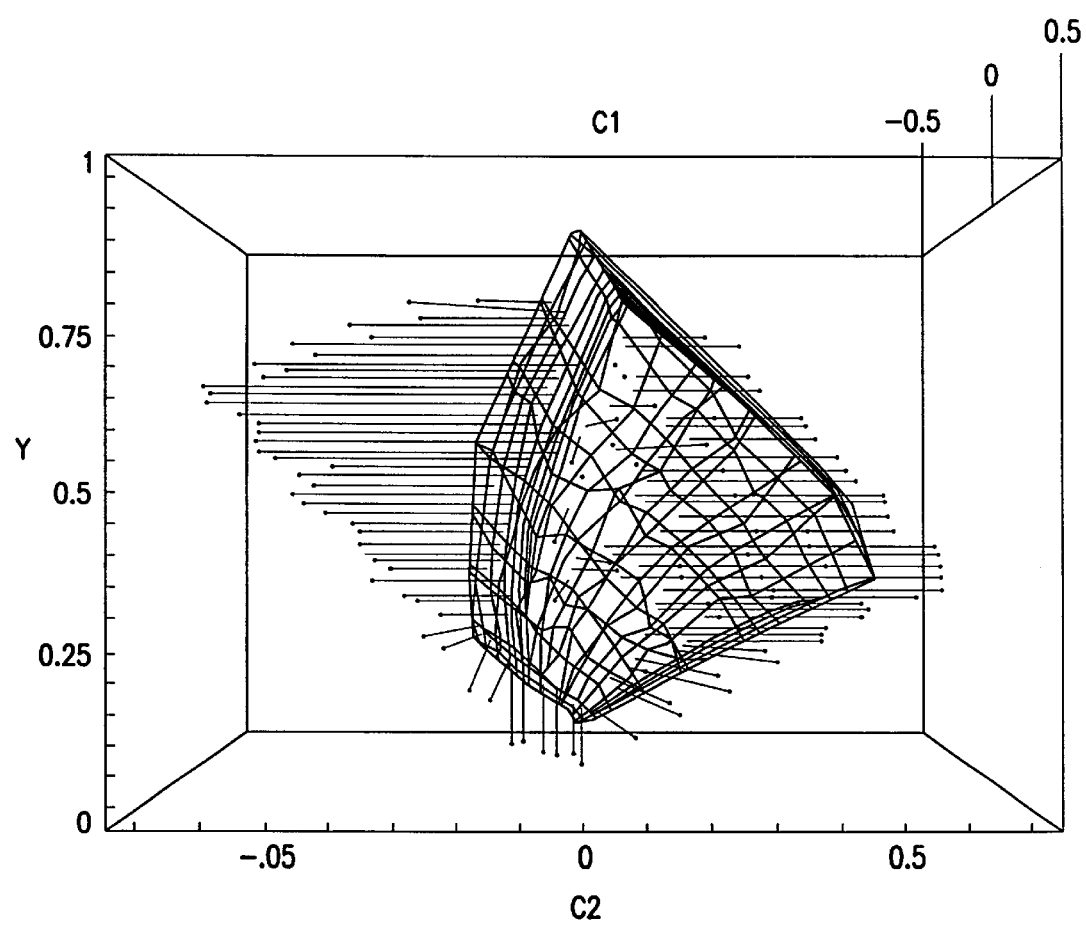
FIG. 3B is an illustration of a $YC_2$ projection of the mapping of FIG. 3A shown in YCC space.
Figure 3C:
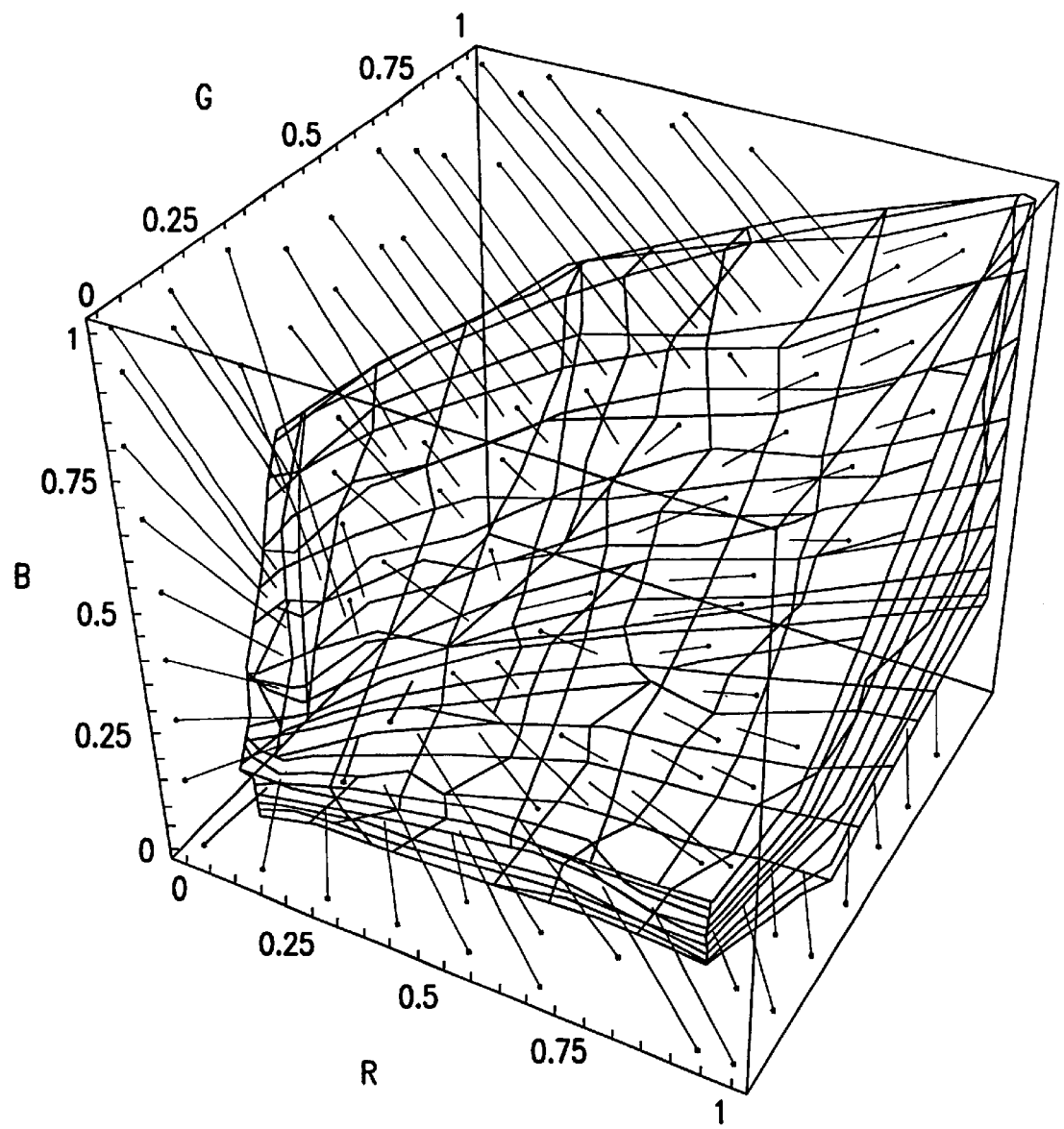
FIG. 3C is an illustration of a sampling of the mapping of FIG. 3A in RGB color space.

Samples of resulting mapping are shown in FIGS. 3A, 3B, and 3C.

Method of Color Mapping

Figure 4:
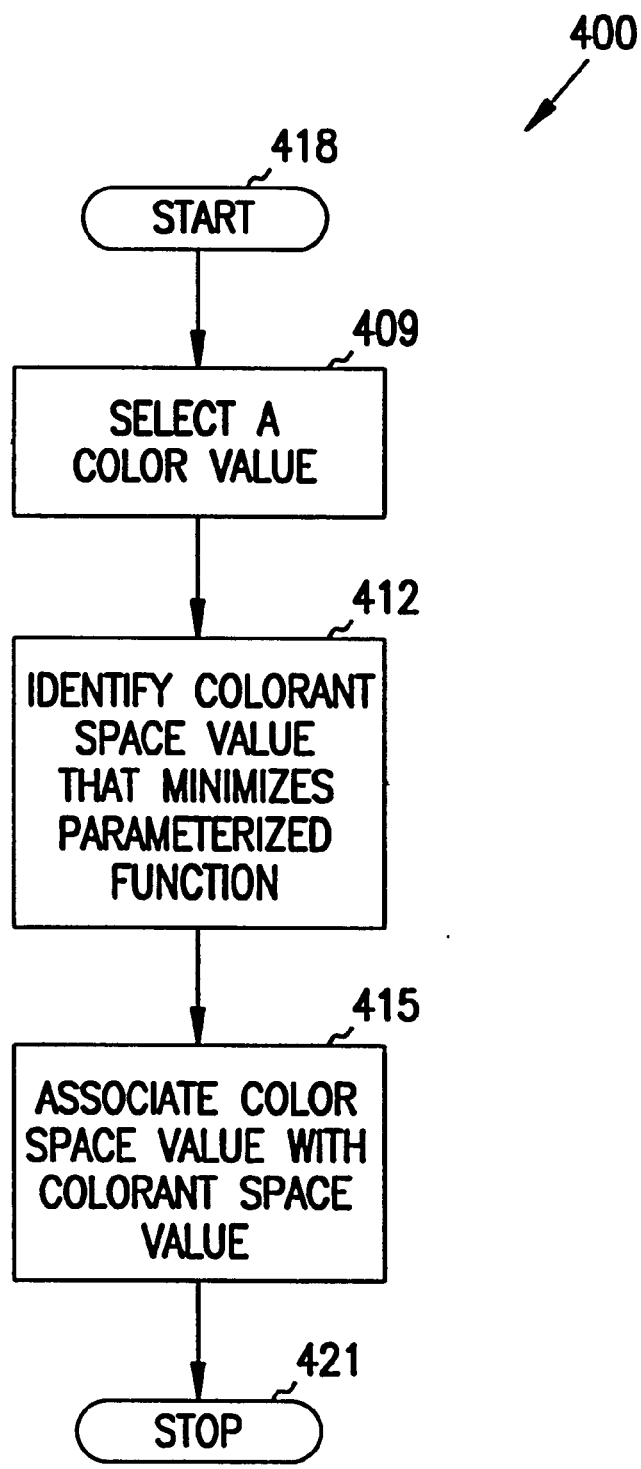
FIG. 4 is a flow diagram of one embodiment of a method for associating color space values with colorant space values.

FIG. 4 is a flow diagram of one embodiment of method 400 for associating color space values with colorant space values. A color space includes the color values for a color image in a calorimetric color space, such as the CIELAB color space. A colorant space includes the control values, such as CMYK values, for a color imaging device, such as a color printer. A colorant space value, when transmitted to a color imaging device, directs the color imaging device to produce a particular color. For example, transmitting a colorant space value for the color red to a color imaging device directs the imaging device, such as a color ink jet printer or a color laser printer, to produce the color red. After a color space representing a color image is associated with a colorant space, the colorant space is capable of directing a color imaging device to produce the color image. To associate the values of a color space with values in a colorant space, method 400 includes the operations of selecting 409, identifying 412, and associating 415.

In the selecting 409 operation, a color value is selected from a color space. The color value selected may represent a pixel in a color image. The selected color value is used to parameterize a function capable of mapping a colorant space into a color space. After the selecting 409 operation, the identifying 412 operation identifies a colorant space value that minimizes the parameterized function. The minimization operation, in one embodiment, is performed by exhaustively searching the colorant space to identify a value that minimizes the parameterized function. Alternatively, the minimization operation is performed by applying a non-linear optimization algorithm to the parameterized function. The associating 415 operation associates the selected color space value with the identified colorant space value. The associating 415 operation may be accomplished in a variety of ways. For example, the associating 415 operation may be accomplished by creating a functional relationship between the selected color space value and the colorant space value, mapping each color space value to a colorant space value, or by using the color space value as an index into a table containing the identified colorant space value. Alternatively, the associating 415 operation may be accomplished by building a color look-up table having an address and an entry, wherein the address is the color value in a color space, and the entry is the color value in a colorant space.

In another embodiment, the association (in the functional or lookup table form) can be performed between a color value from second color or colorant space (such as sRGB or CMYK) and the colorant space value. The second color or colorant values of such an association can be related to the first color space value, for example, the CMYK colorant space values can correspond to measured CIELAB values produced by a printer to be emulated.

To summarize, in method 400, to associate a color space with a colorant space, the selecting 409 operation selects a color value from a color space, which includes the color values for a color image. The identifying 412 operation identifies a value in a colorant space that minimizes a function parameterized to the color value selected from the color space. And the associating 415 operation associates the selected color value to the identified value in the identifying 412 operation. In this way, a color space value is associated with a colorant space value which is capable of directing a color imaging device to produce the particular color value represented by the color space value.

Figure 5:
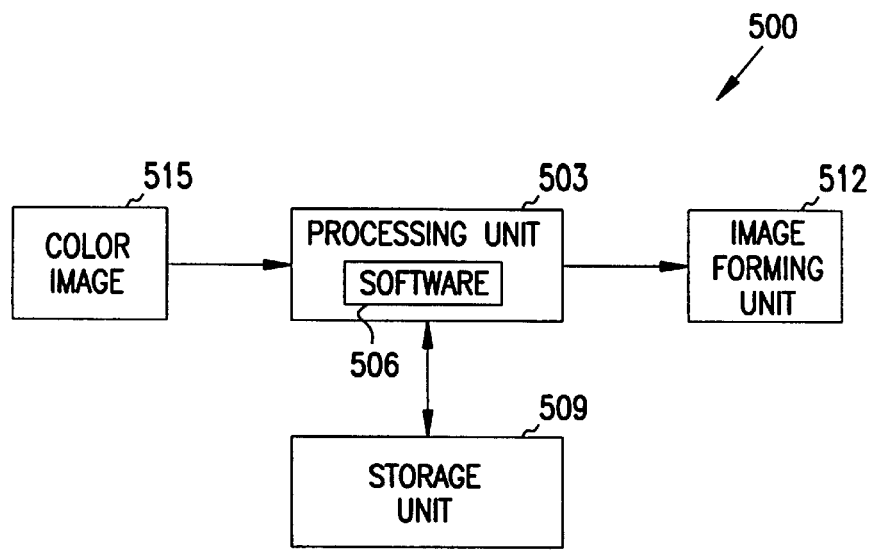
FIG. 5 is a block diagram of one embodiment of an apparatus capable of mapping a color space to a colorant space.

FIG. 5 is a block diagram of one embodiment of an apparatus 500 capable of mapping a color space to a colorant space and populating a color look-up table with the mapping. Apparatus 500 includes processing unit 503, software means 506, storage unit 509, and image forming unit 512. Processing unit 503 is coupled to storage unit 509 and image forming unit 512. Software means 506 is operative on processing unit 503. Color image 515 is an input to processing unit 503.

Processing unit 503 is not limited to a particular type of information processor. Processing units suitable for use in connection with the present invention include microprocessors, mainframe processors, mid-range processors, reduced instruction set processors, complex instruction set processor, parallel processors, and massively parallel processors.

Storage unit 512 is not limited to a particular type of storage unit. In one embodiment, storage unit 512 is a solid state memory. Alternatively, storage unit 512 is a magnetic memory. In still another alternate embodiment, storage unit 512 is an optical memory or a holographic memory.

Image forming unit 512 is not limited to a particular type of image forming unit. In one embodiment, image forming unit 512 is a color image forming unit, such as a color ink jet printer, a color laser printer, or an offset printing system. Alternatively, image forming unit 512 is a display device, such as a CRT, a plasma display, a liquid crystal display, or a holographic display. In still another alternate embodiment, image forming unit 512 is an image capture device, such as a color scanner.

Figure 6:
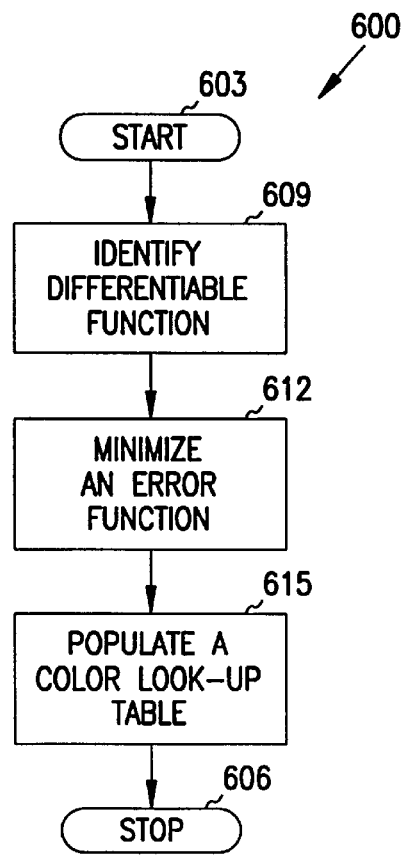
FIG. 6 is a flow diagram of one embodiment of a method for populating a color look-up table with values from a colorant space.

Software means 506, in one embodiment, performs the operations of method 600 shown in the flow diagram of FIG. 6. FIG. 6 is a flow diagram of a method for populating a color look-up table by mapping from a color space to a colorant space. Method 600 begins with the start 603 operation and terminates with the stop 606 operation. After the start 603 operation, method 600 includes an identifying 609 operation, a minimizing 612 operation, and a populating 615 operation. The identifying 609 operation includes identifying a differentiable function. The differentiable functions maps a colorant space to a color space. In one embodiment the differentiable function is a polynomial. In an alternate embodiment, the differentiable function is an interpolation table capable of mapping a color space into a colorant space. The minimizing 612 operation minimizes a function of the differentiable function. The function of the differentiable function includes error terms and constraint terms. By minimizing the function of the differentiable function parameterized to a each element of the color space, a mapping from the color space to the colorant space is obtained. The mapping values may be used to populate a color look-up table having a color space value for the address value in the color look-up table and having a colorant space value as the entry in the color look-up table.

Figure 7:
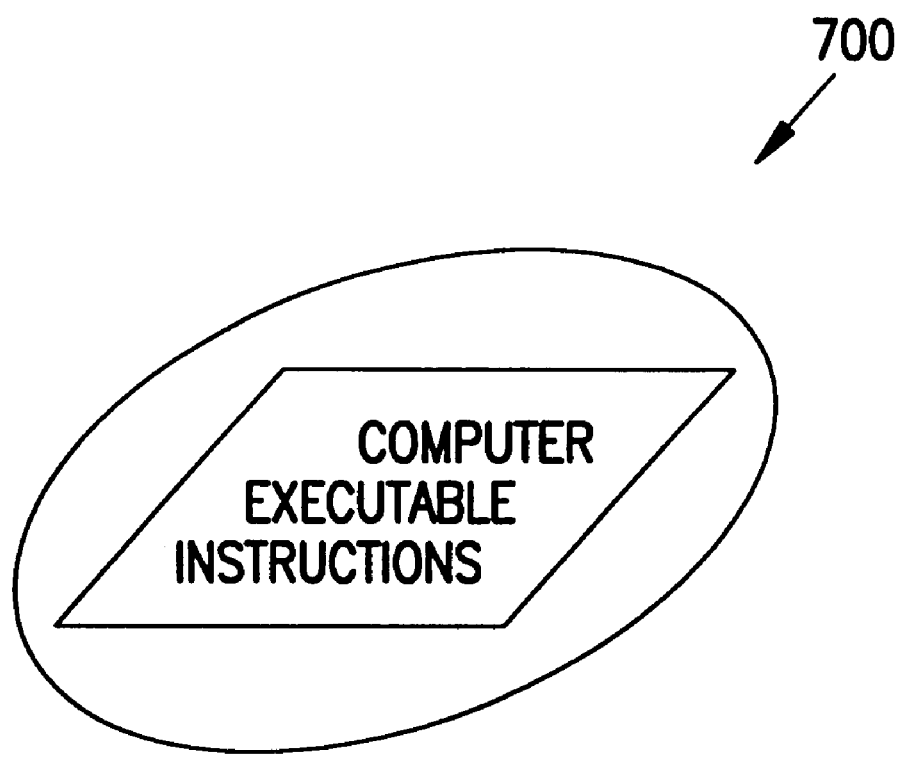
FIG. 7 is an illustration of one embodiment of a computer-readable medium including computer-executable instructions suitable for use in connection with the present invention.

FIG. 7 is an illustration of one embodiment of a computer-readable medium 700 including computer executable instructions 703. Computer readable medium 700 includes any media capable of storing information, such as magnetic media, optical media, or electronic semiconductor media. Computer executable instructions 703 include instructions for mapping a color space to a colorant space, such as could be coded based on the methods shown in FIG. 6 and including the operations of identifying 609, minimizing 612, and populating 615 as described with respect to FIG. 6.

A method and apparatus for color mapping has been described. The method identifies a forward function for mapping a colorant space to a color space. Error terms and constraint terms are identified. Finally, the method associates values from the color space with values from the colorant space by minimizing the error function parameterized to each element of the color space.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method comprising:
   selecting a color value from a color space;
   identifying a color value in a colorant space that minimizes a function parameterized by the color value selected from the color space; and
   associating the color value selected from the color space with the color value identified in the colorant space;
   wherein said identifying a color value in a colorant space consists essentially of iteratively determining error and error gradient related to a first color value in said colorant space and determining a second color value in said colorant space based on said gradient.

2. The method of claim 1, wherein identifying a color value in a colorant space that minimizes a function parameterized by the color value selected from the color space comprises:
   computing a function that is capable of mapping the colorant space to the color space.

3. The method of claim 2, further comprising:
   storing the color value selected from the color space as an address in a look-up table and storing the color value identified in the colorant space as an entry for the address.

4. A method for obtaining a mapping of a color space to a colorant space, the method comprising:
   identifying a differentiable function capable of mapping the colorant space to the color space; and
   minimizing an error function of the differentiable function to obtain the mapping of the color space to the colorant space;
   wherein said minimizing an error function comprises iteratively determining error and error gradient related to a first color value in said colorant space and determining a second color value in said colorant space based on said gradient.

5. The method of claim 4, further comprising:
   building a color look-up table having an address and an entry wherein the address is the color value in the color space and the entry is the color value in the colorant space.

6. The method of claim 4, wherein identifying a differentiable function capable of mapping the colorant space to the color space comprises:
   identifying a differentiable function defined by a polynomial.

7. The method of claim 4, wherein identifying a differentiable function capable of mapping the colorant space to the color space comprises:
   identifying a differentiable function defined by a linear interpolation table.

8. The method of claim 4, wherein minimizing an error function of the differentiable function to obtain the function capable of mapping the color space to the colorant space comprises:
   applying a non-linear optimization algorithm to the error function.

9. A method comprising:
   identifying a first function capable of mapping a colorant space to a color space; and
   obtaining a second function from the first function by solving a constrained optimization problem including a constraint
   wherein obtaining a second function from the first function by solving a constrained optimization problem including a constraint comprises:
   converting the constraint to a differentiable penalty term; and
   solving a resulting unconstrained optimization problem by finding a value in the colorant space that minimizes the constraint for a value in the color space.

10. The method of claim 9, wherein converting the constraint to a differentiable penalty term comprises:
    substituting a biquadratic penalty function for the constraint.

11. The method of claim 9, wherein converting the constraint to a differentiable penalty term comprises:
    substituting a bicubic penalty function for the constraint.

12. A method for building a color look-up table for a printer comprising:
    identifying a differentiable function capable of mapping a colorant space having a plurality of colorant space values to a color image space having a plurality of color image space values;
    minimizing an error function of the differentiable function, the error function including a color difference error, to obtain a function capable of mapping the color image space to the colorant space; and
    populating the color look-up table such that the color look-up table is capable of mapping at least one of the color image space values to at least one of the plurality of colorant space values according to the function;
    wherein said minimizing an error function comprises iteratively determining error and error gradient related to a first color value in said colorant space and determining a second color value in said colorant space based on said gradient.

13. A method for printing an image comprising:
    acquiring an image having a color space;
    identifying a differentiable function capable of mapping a number of colorant values to the color space;
    minimizing an error function of the differentiable function, the error function including a color difference error and a printer constraint, to obtain a function capable of mapping the color space to the number of colorant values;
    mapping the color space to the number of colorant values according to the function; and
    transmitting the number of colorant values to an imaging unit;
    wherein said minimizing an error function comprises iteratively determining error and error gradient related to a first color value in said colorant space and determining a second color value in said colorant space based on said gradient.

14. The method of claim 13, wherein transmitting the number of colorant values to an imaging unit comprises:
    transmitting the number of colorant values to a color ink jet printer.

15. The method of claim 13, wherein transmitting the number of colorant values to an imaging unit comprises:
    transmitting the number of colorant values to a color laser printer.

16. Apparatus for mapping a color space to a colorant space comprising:
    a processing unit;
    a memory unit coupled to the processing unit; and
    software means operative on the processing unit for:
    minimizing an error function of a differentiable function capable of mapping the colorant space to the color space to obtain a function capable of mapping the color space to the colorant space, the error function including a color difference error;

wherein minimizing an error function of a differentiable function capable of mapping a colorant space to a color space to obtain a function capable of mapping the color space to the colorant space, the error function including a color difference error comprises:

applying a scaled conjugate gradient algorithm to the error function to obtain a function capable of mapping the color space to the colorant space.

17. Apparatus for printing a color image having a color space on a printing unit having a colorant space, the apparatus comprising:

a processing unit;

a storage unit coupled to the processing unit;

an imaging unit coupled to the processing unit; and software means operative on the processing unit for:

identifying a differentiable function capable of mapping the colorant space to the color space;

minimizing an error function of the differentiable function, the error function including a color difference error and a printer constraint, to obtain a function capable of mapping the color space to the colorant space;

mapping the color space to the colorant space according to the function; and transmitting the colorant space to the imaging unit;

wherein said minimizing an error function comprises iteratively determining error and error gradient related to a first color value in said colorant space and determining a second color value in said colorant space based on said gradient.

* * * * *